(12) United States Patent
Lösche-Ter Horst et al.

(10) Patent No.: US 11,152,627 B2
(45) Date of Patent: Oct. 19, 2021

(54) BIPOLAR PLATE WHICH HAS REACTANT GAS CHANNELS WITH VARIABLE CROSS-SECTIONAL AREAS, FUEL CELL STACK, AND VEHICLE COMPRISING SUCH A FUEL CELL STACK

(71) Applicants: AUDI AG, Ingolstadt (DE); VOLKSWAGEN AG, Wolfsburg (DE)

(72) Inventors: Tobias Lösche-Ter Horst, Wolfsburg (DE); Hannes Scholz, Braunschweig (DE)

(73) Assignees: AUDI AG, Ingolstadt (DE); Volkswagen AG, Wolfsburg (DE)

( * ) Notice: Subject to any disclaimer, the term of this patent is extended or adjusted under 35 U.S.C. 154(b) by 89 days.

(21) Appl. No.: 16/095,565

(22) PCT Filed: Apr. 26, 2017

(86) PCT No.: PCT/EP2017/059881
§ 371 (c)(1),
(2) Date: Oct. 22, 2018

(87) PCT Pub. No.: WO2017/186770
PCT Pub. Date: Nov. 2, 2017

(65) Prior Publication Data
US 2019/0131636 A1 May 2, 2019

(30) Foreign Application Priority Data

Apr. 28, 2016 (DE) .................. 102016107906 .5

(51) Int. Cl.
*H01M 8/0267* (2016.01)
*H01M 8/2432* (2016.01)
(Continued)

(52) U.S. Cl.
CPC ......... *H01M 8/0267* (2013.01); *H01M 8/026* (2013.01); *H01M 8/0258* (2013.01);
(Continued)

(58) Field of Classification Search
CPC ........... H01M 2250/20; H01M 8/0258; H01M 8/026; H01M 8/0265; H01M 8/0267; H01M 8/04089; H01M 8/2432; Y02T 90/32
See application file for complete search history.

(56) References Cited

U.S. PATENT DOCUMENTS

| 6,756,149 B2 | 6/2004 | Knights et al. |
| 2003/0077501 A1 | 4/2003 | Knights et al. |
| 2014/0134510 A1 | 5/2014 | Kawabata et al. |

FOREIGN PATENT DOCUMENTS

| DE | 100 45 098 A1 | 4/2002 |
| DE | 103 23 644 B4 | 5/2009 |

(Continued)

*Primary Examiner* — Adam A Arciero
(74) *Attorney, Agent, or Firm* — Seed Intellectual Property Law Group LLP

(57) ABSTRACT

The invention relates to a bipolar plate for a fuel cell, comprising an anode plate with anode gas channels and a cathode plate with cathode gas channels, said plates having an active region and supply regions and being arranged one over the other such that the gas channels form coolant channels. The aim of the invention is to improve such a bipolar plate such that the flow conditions of reactants and coolant in the bipolar plate are optimized. This is achieved in that the height and/or the width of the cathode gas channels increase(s) from a first side of the active region to a second side of the active region, and the height and/or the width of the anode gas channels decrease(s) from the first side of the active region to the second side of the active region, wherein the cross-sectional area and/or the hydraulic diameter of the cathode gas channels increases, and the (Continued)

cross-sectional area and/or the hydraulic diameter of the anode gas channels decreases. The invention additionally relates to a fuel cell stack and to a vehicle.

15 Claims, 7 Drawing Sheets

(51) Int. Cl.
*H01M 8/0265* (2016.01)
*H01M 8/026* (2016.01)
*H01M 8/0258* (2016.01)
*H01M 8/04089* (2016.01)

(52) U.S. Cl.
CPC ..... *H01M 8/0265* (2013.01); *H01M 8/04089* (2013.01); *H01M 8/2432* (2016.02); *H01M 2250/20* (2013.01); *Y02T 90/40* (2013.01)

(56) References Cited

FOREIGN PATENT DOCUMENTS

| | | |
|---|---|---|
| DE | 10 2012 221 802 A1 | 5/2014 |
| DE | 10 2014 206 335 A1 | 10/2015 |
| EP | 2 026 393 A1 | 2/2009 |
| JP | 2003-132911 A | 5/2003 |
| JP | 2006-134582 A | 5/2006 |
| KR | 10-2015-0070582 A | 6/2015 |

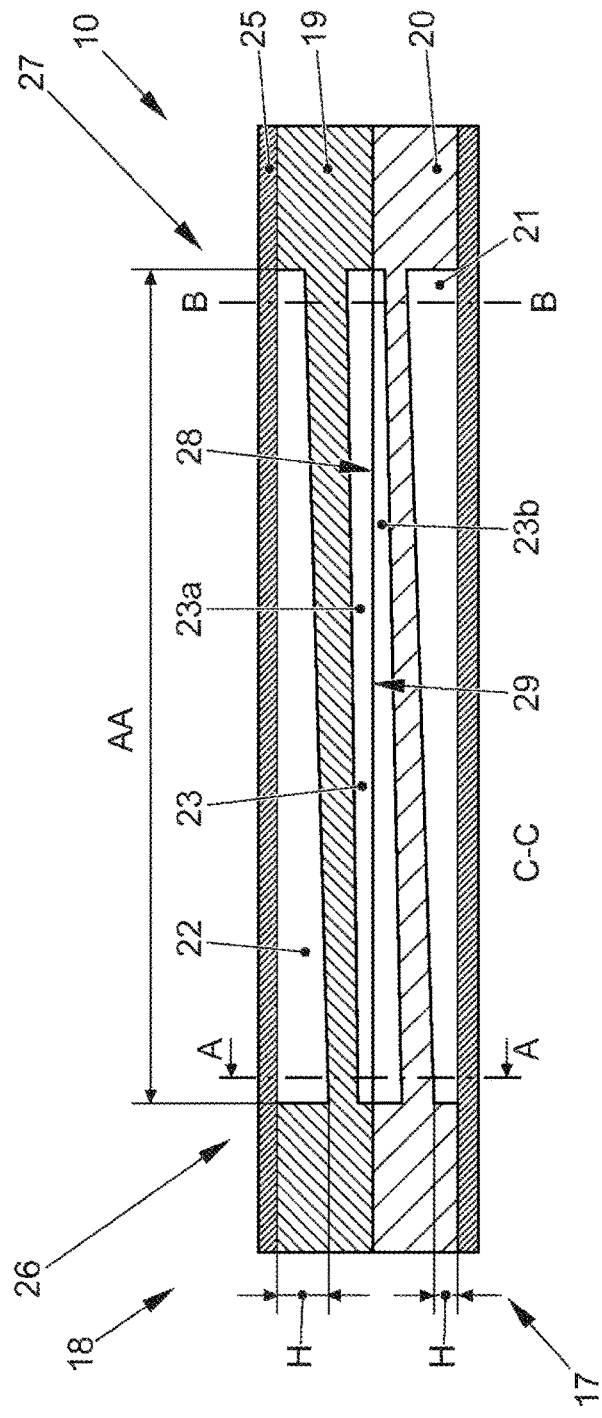
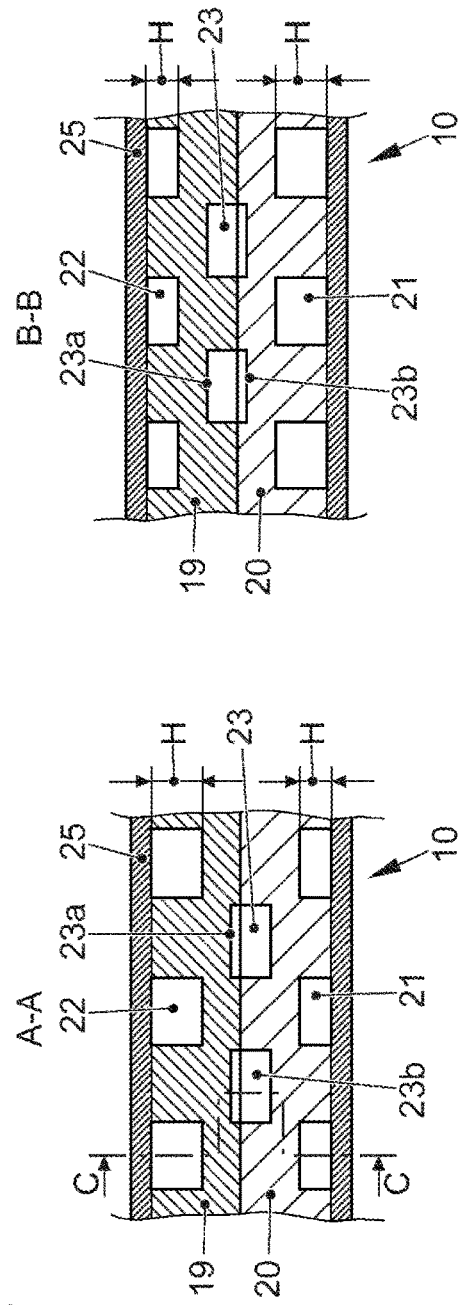
FIG. 2
FIG. 3
FIG. 4

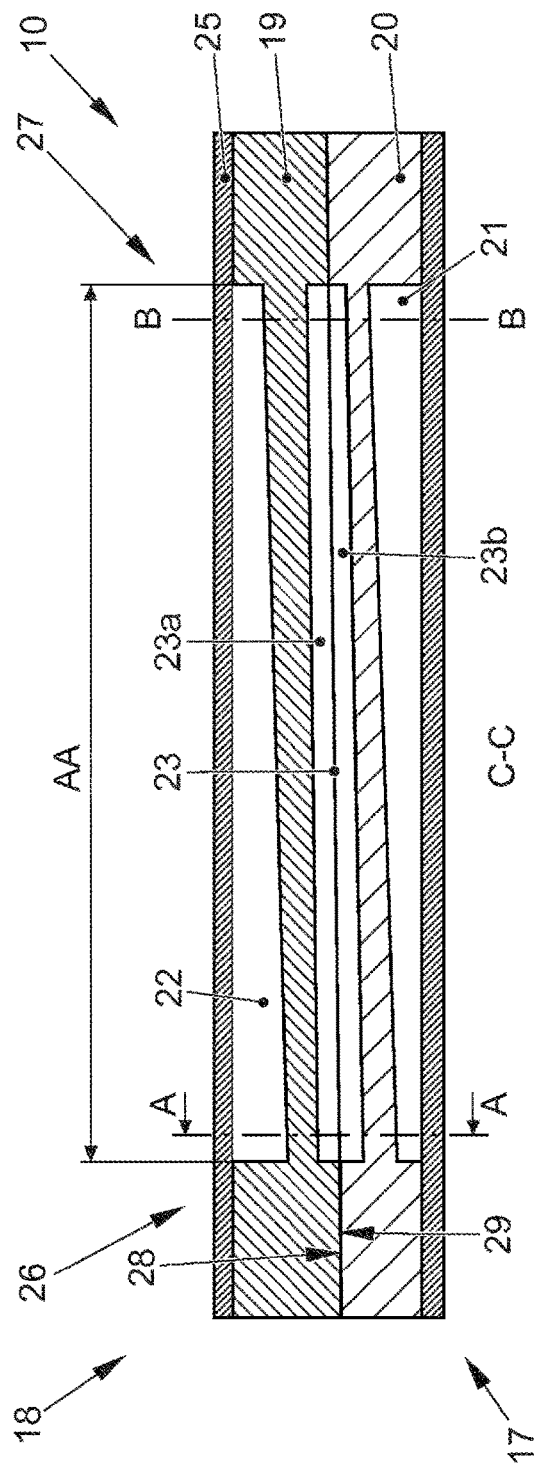
FIG. 7
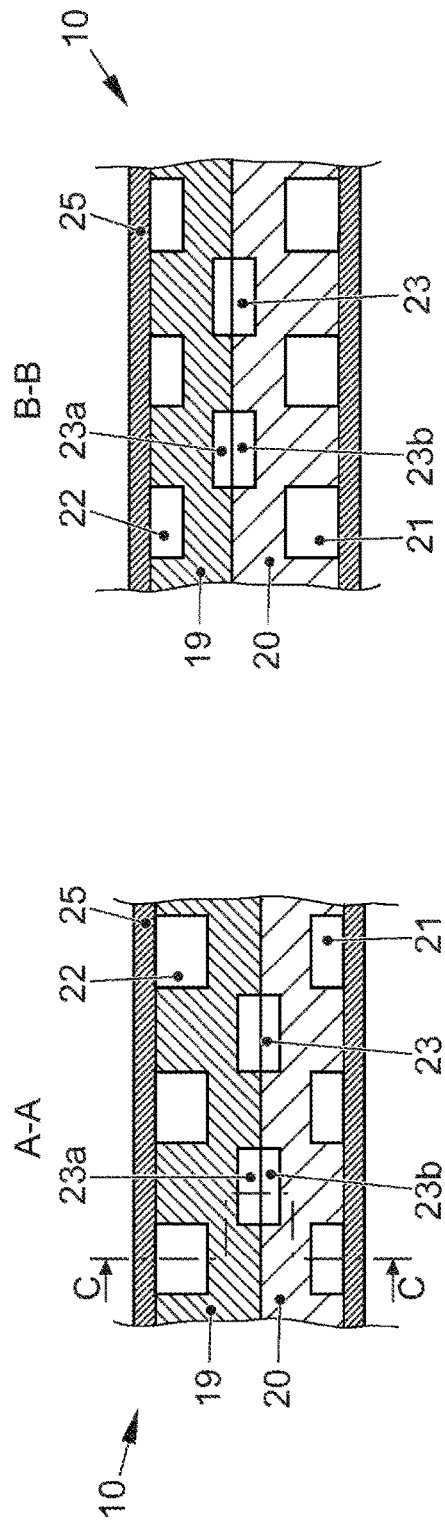
FIG. 9
FIG. 8

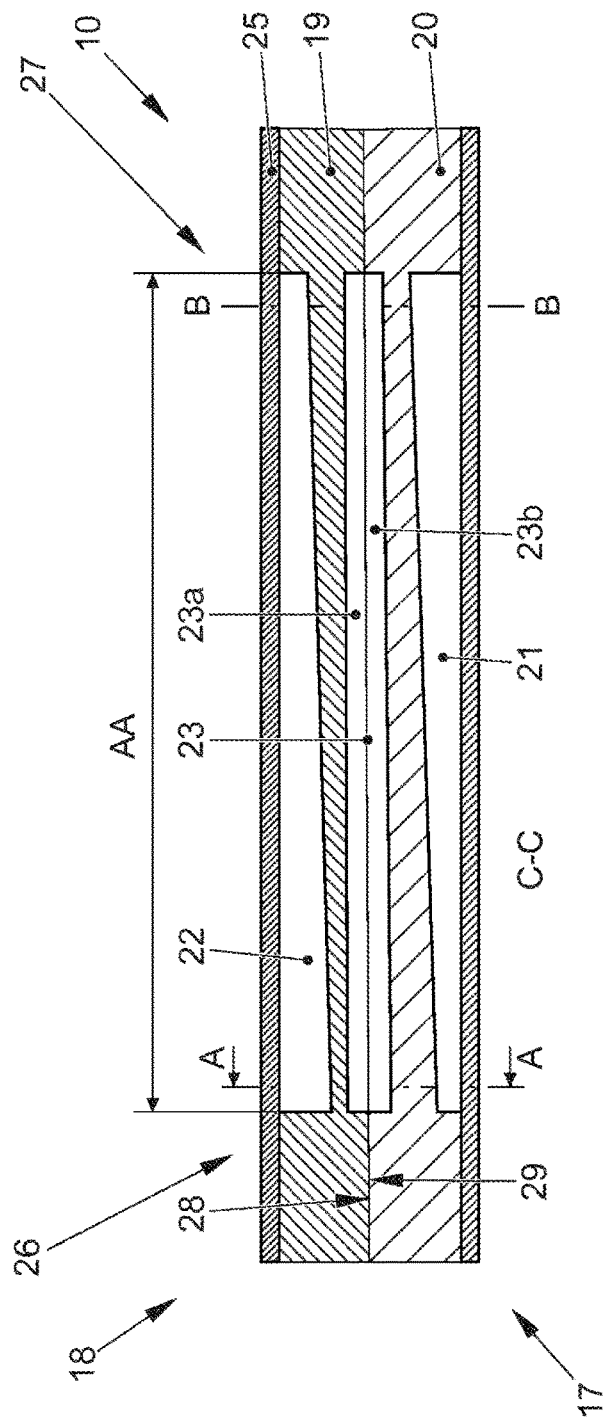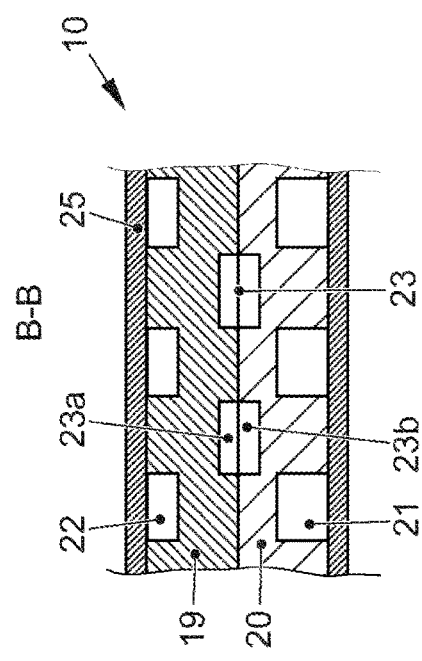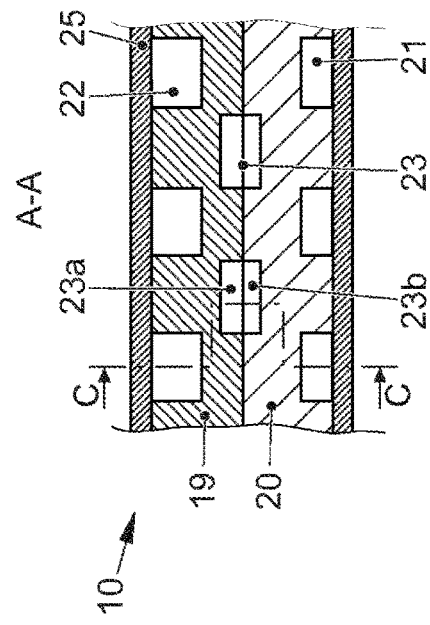
FIG. 12
FIG. 13
FIG. 14

BIPOLAR PLATE WHICH HAS REACTANT GAS CHANNELS WITH VARIABLE CROSS-SECTIONAL AREAS, FUEL CELL STACK, AND VEHICLE COMPRISING SUCH A FUEL CELL STACK

BACKGROUND

Technical Field

The invention relates to a bipolar plate for a fuel-cell—comprising an anode plate and a cathode plate, each having an active area and two supply areas for the supply and discharge of operating media to or from the active area, wherein the supply areas in each case have an anode gas port for supplying or discharging fuel, a cathode gas port for supplying or discharging oxidant, and also a coolant port for supplying or discharging coolant, and wherein the anode plate has anode gas channels and the cathode plate has cathode gas channels which in each case are in the form of open, gutter-like channel structures and so arranged above another and formed that the anode plate and cathode plate in the adjacent sides form coolant channels which connect the coolant ports of the two supply areas—as well as to a fuel-cell stack and a vehicle with such a fuel-cell stack.

Description of the Related Art

Fuel-cells use the chemical conversion of a fuel with oxygen into water in order to generate electrical energy. For this purpose, fuel-cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals—in particular, platinum. In addition, gas diffusion layers (GDL) can be arranged on both sides of the membrane electrode assembly, on the sides of the electrodes facing away from the membrane. Generally, the fuel-cell is formed by a plurality of MEA's arranged in the stack, the electrical power outputs of which add up. Between the individual membrane electrode assemblies, bipolar plates (also called flow field plates or separator plates) are usually arranged, which ensure a supply of the individual cells with the operating media, i.e., the reactants, and are usually also used for cooling. In addition, the bipolar plates also ensure an electrically-conductive contact to the membrane electrode assemblies.

While the fuel-cell is operating, the fuel (anode operating medium)—in particular, hydrogen $H_2$ or a hydrogen-containing gas mixture—is supplied to the anode via an anode-side open flow field of the bipolar plate where electrochemical oxidation of $H_2$ into protons $H^+$ occurs with the release of electrons ($H_2 \rightarrow 2\,H^+ + 2\,e^-$). Protons are transported (water-bound or water-free) from the anode chamber into the cathode chamber across the electrolyte or membrane that separates and electrically insulates the reaction chambers gas tight from each other. The electrons provided at the anode are guided to the cathode via an electrical line. Oxygen or an oxygen-containing gas mixture (such as air) as the cathode operating medium is supplied to the cathode via a cathode-side, open flow field of the bipolar plate so that a reduction of $O_2$ to $O^{2-}$ occurs with the accretion of electrons ($\frac{1}{2}O_2 + 2\,e^- \rightarrow O^{2-}$). At the same time, in the cathode chamber the oxygen anions react with the protons transported across the membrane with the formation of water ($O^{2-} + 2\,H^+ \rightarrow H_2O$).

There are a number of different approaches to optimizing the flow conditions of reactants and coolant in the bipolar plates.

Accordingly, a fuel-cell is described in DE 103 23 644 B4 in which the channel volume of channels through which reaction gas flows is reduced in the direction of flow by a section-by-section reduction in the number of parallel channels.

U.S. Pat. No. 6,756,149 B2 proposes a fuel-cell in which the height and width of the reaction gas channels are varied throughout the flow field, wherein, however, the cross-sectional area remains constant.

In EP 2 026 393 A1, a bipolar plate for a fuel-cell is disclosed in which the cross-section of anode gas channels and cathode gas channels changes in such a way along an active area that it increases in the direction of flow.

US 2014/134510 A1 describes a bipolar plate of a fuel-cell with coolant channels which, throughout the active area, have a constant cross-section.

BRIEF SUMMARY

The aim of the present invention is to provide a bipolar plate in which the gas composition and mass flows in the reaction gas channels in relation to the length of the active area are taken into account.

The invention provides a bipolar plate for a fuel-cell comprising a profiled anode plate and a cathode plate, each comprising an active area and two supply areas for the supply and discharge of operating media to or from the active area, wherein the supply areas in each case have an anode gas port for supplying or discharging fuel, a cathode gas port for supplying or discharging oxidant, and also a coolant port for supplying or discharging coolant, and wherein the anode plate has anode gas channels and the cathode plate has cathode gas channels which in each case take the form of open, groove-like channel structures, which represent the aforementioned profiling, and are so arranged above one another and formed that the anode plate and cathode plate in the adjacent sides form coolant channels which connect the coolant ports of the two supply areas, wherein the height and/or width of the cathode gas channels increase(s) from a first side of the active area towards a second side of the active area, and the height and/or width of the anode gas channels decrease(s) in the direction of flow from the first side of the active area towards the second side of the active area, wherein the cross-sectional area and/or the hydraulic diameter of the cathode gas channels increases, and the cross-sectional area and/or the hydraulic diameter of the anode gas channels decreases.

The terms, anode gas port, cathode gas port, and coolant port, respectively comprise an anode inlet opening, anode outlet opening, cathode inlet opening, cathode outlet opening, coolant inlet opening, and coolant outlet opening. These terms are also used below.

The embodiment according to the invention offers the advantage that, due to the variable design of the reactant gas channels, the gas composition in the individual channels which changes during flow through the active area can be manipulated, or the flow conditions can be optimized. In this way, an optimal humidification of the reaction gases can be ensured.

The pressure distribution, moisture distribution, and velocity distribution in the anode and cathode gas channels in the active area of the bipolar plate are optimized by the embodiment according to the invention of a bipolar plate or the anode and cathode plates. In this context, optimization means that—preferably over the entire active area—there should be uniform pressure conditions, uniform humidification of the reactants, as well as identical flow rates.

The narrowing of the anode gas channel is to be regarded as an example of this, whereby consumption of the anode gas falls along the direction of flow of the mass flow. This can result in the flow rate being so low in the last half of the anode gas channel that liquid water there can no longer be reliably discharged. This would reduce the performance and lifespan of the fuel-cell. This effect is counteracted by the narrowing anode gas channel, since this increases the flow rate. Advantageously, the performance and lifespan of the fuel-cell or fuel-cell stack are thereby increased.

Changing the height of anode gas and cathode gas channels is preferable to changing the width, since, with the width unchanged, the contact behavior of the anode and cathode plates with respect to the membrane is simpler and easier to adjust.

The bipolar plate is preferably a rectangular bipolar plate to enable a good, i.e., space-saving, arrangement of fuel-cell stacks. In addition, trimming of the MEA can thereby be facilitated and cutting losses avoided.

Similarly, it is preferred that the profiled sides of the anode and cathode plates be aligned piano-parallel to each other, thereby making possible an easy stackability of fuel-cells and cuboidal cell stacks, which themselves also can be used in an especially space-saving manner.

The mutually-facing sides of the anode and cathode plates are also, preferably, piano-parallel to the profiled sides.

However, embodiments are also claimed in which the mutually-facing sides of the anode and cathode plates are not, however, piano-parallel to the profiled sides of the anode and cathode plates, which, for their part, are piano-parallel to each other. This results in wedge-shaped anode and cathode plates, which, when joined together, form a cuboidal bipolar plate, which can be stacked well. Here, the thickness of the cathode plate increases from the first side of the active side in the direction of the second side of the active area, while the reverse arrangement applies to the anode plate.

The coolant channels are proportionally formed by anode and cathode plates so that, in the anode and cathode plates, in each case, coolant subchannels are provided which, when the anode and cathode plates are brought together, form the coolant channels.

The cross-sectional area or hydraulic diameter of the coolant channels remains essentially constant along the active area, wherein the coolant subchannels formed in the anode and cathode plates can here, like the reaction gas channels, be variable.

If all surfaces of the anode and cathode plate are piano-parallel, the coolant subchannels will preferably be variable so as to adapt themselves to the course of anode and cathode gas channels or to run essentially parallel to and between them, wherein embodiments are also possible in which the coolant channels do not run parallel to the anode gas and cathode gas channels.

The coolant subchannels can be formed such that the resulting coolant channels run parallel to the anode gas and cathode gas channels or parallel to the profiled sides of the anode and the cathode plates.

In the embodiment in which the mutually-facing sides are not plano-parallel to the profiled sides, the coolant subchannels are preferably not variable, provided the slope of the mutually-facing sides corresponds to the slope of the anode gas channel and cathode gas channel.

In addition, the coolant subchannels of the anode plate and of the cathode plate in all embodiments need not necessarily have an identical cross-sectional area or a hydraulic diameter. This is (these are) determined by its (their) proximity to the anode gas or cathode gas channels.

According to a particularly preferred embodiment of the bipolar plate according to the invention, the height of the anode gas and cathode gas channels is varied.

In a preferred embodiment of the invention, the operating medium channels have a trough-shaped design with a flank angle of less than 90°, so that, advantageously, simplified production is possible.

The fuel-cell stack according to the invention comprises a stack of alternately arranged membrane electrode units and bipolar plates, designed as previously described.

Another aspect of the invention relates to a vehicle that has at least one fuel-cell stack according to the invention. The vehicle is preferably an electric vehicle in which electrical energy generated by the fuel-cell system serves to supply an electric traction motor and/or a traction battery.

Additional preferred embodiments of the invention arise from the remaining features mentioned in the dependent claims.

The various embodiments of the invention mentioned in this application may be combined advantageously with one another, unless stated otherwise in individual cases.

BRIEF DESCRIPTION OF THE SEVERAL VIEWS OF THE DRAWINGS

The invention is explained below in exemplary embodiments in reference to the respective drawings. The following are shown:

FIG. 2 is a sectional view (C-C) in the longitudinal direction of a bipolar plate according to the invention according to a first embodiment, which is arranged between two membrane electrode units;

FIG. 3 is a sectional view (A-A) in the transverse direction of the bipolar plate according to FIG. 2;

FIG. 4 is a sectional view (B-B) in the transverse direction of a bipolar plate according to FIG. 2;

FIG. 7 is a sectional view (C-C) in the longitudinal direction of a bipolar plate according to the invention according to a second embodiment, which is arranged between two membrane electrode units;

FIG. 8 is a sectional view (A-A) in the transverse direction of the bipolar plate according to FIG. 7;

FIG. 9 is a sectional view (B-B) in the transverse direction of a bipolar plate according to FIG. 7;

FIG. 12 is a sectional view (C-C) in the longitudinal direction of a bipolar plate according to the invention according to a third embodiment, which is arranged between two membrane electrode units;

FIG. 13 is a sectional view (A-A) in the transverse direction of the bipolar plate according to FIG. 12;

FIG. 14 is a sectional view (B-B) in the transverse direction of a bipolar plate according to FIG. 12;

DETAILED DESCRIPTION

Figure 1:
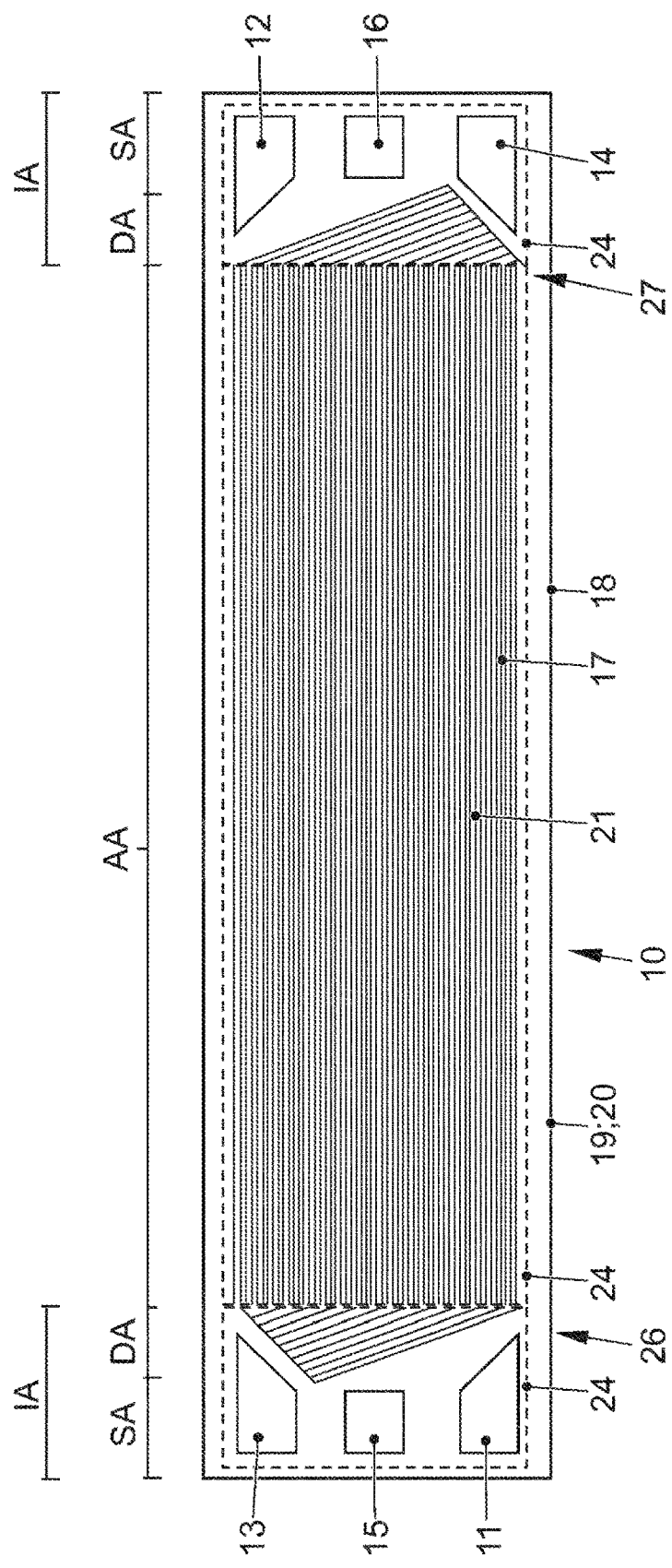
FIG. 1 is a top view of a bipolar plate.

FIG. 1 shows a top view of rectangular bipolar plate 10 according to the invention.

The bipolar plate 10 is divided into an active area AA and inactive areas IA. The active area AA is characterized in that the fuel-cell reactions take place in this area. The inactive areas IA can in each case be divided into supply areas SA and distribution areas DA, wherein the distribution areas DA connect the supply areas SA to the active area AA.

An anode inlet opening 11 for supplying the anode gas, i.e., the fuel, e.g., hydrogen, is provided within a supply area SA. The anode outlet opening 12 in the other supply area SA is used for discharging the anode exhaust gas after overflowing the active area AA. The cathode inlet opening 13 in the first supply area SA is used for supplying the cathode gas, which is, in particular, oxygen or an oxygen-containing mixture—preferably, air. The cathode outlet opening 14 is used for discharging the cathode gas after overflowing the active area AA in the other supply area SA. The coolant inlet opening 15 is used for supplying and the coolant outlet opening 16 is used for discharging the coolant in the various supply areas SA.

The bipolar plate 10 shown in FIG. 1 has a cathode side 17 that is visible in the illustration and also an anode side 18 that is not visible, wherein the bipolar plate 10 is constructed from an anode plate 19 and a cathode plate 20, which are joined to each other. On the cathode side 17 illustrated, cathode gas channels 21 are formed as open, groove-like channel structures which connect the cathode inlet opening 13 to the cathode outlet opening 14. Similarly, the anode side 18 (not visible here) has corresponding anode gas channels 22 which connect the anode inlet opening 11 to the anode outlet opening 12. The anode gas channels 22 also take the form of open, groove-like channel structures. Enclosed coolant channels 23 run within the interior of the bipolar plate 10, between the anode plate 19 and the cathode plate 20, and connect the coolant inlet opening 15 to the coolant outlet opening 16. The dashed lines in FIG. 1 indicate seals 24.

FIG. 2 shows a bipolar plate 10 according to FIG. 1 in a longitudinal section C-C, the course of which is shown in FIG. 3. FIGS. 3 and 4 show cross-sections A-A and B-B of the bipolar plate 10, showing, respectively, the first side 26 (inlet side) and the second side 27 (outlet side) of the active area AA of the bipolar plate 10.

Membrane electrode units 25 are arranged on the cathode side 17 and also on the anode side 18 of the bipolar plate 10. The anode gas channels 22, the cathode gas channels 21, and the coolant channels 23 extend, as already explained for FIG. 1, over the active area AA from a first side 26 of the active area AA to a second side 27 of the active area AA, wherein the coolant channels 23 are formed from coolant subchannels 23a, 23b in the anode plate 19 and the cathode plate 20. The profiled sides of the anode and cathode plates 19, 20, as well as their mutually-facing sides 28, 29, into which the coolant subchannels 23a, 23b are incorporated, are piano-parallel in form.

The height H of the anode gas channels 22 decreases from the first side 26 to the second side 27 of the active area AA. In contrast, the height H of the cathode gas channels 21 increases from the first side 26 to the second side 27 of the active area AA. The coolant channels 23, on the other hand, extend over the active area AA with a constant cross-sectional area and/or a constant hydraulic diameter, wherein the distance from the anode and cathode gas channels 21, 22 remains constant, and wherein the coolant subchannels 23a in the anode plate 19 have an increasing partial cross-sectional area and/or a hydraulic partial diameter. In the case of the cathode plate 20, this is formed in exactly the opposite way.

Figure 5:
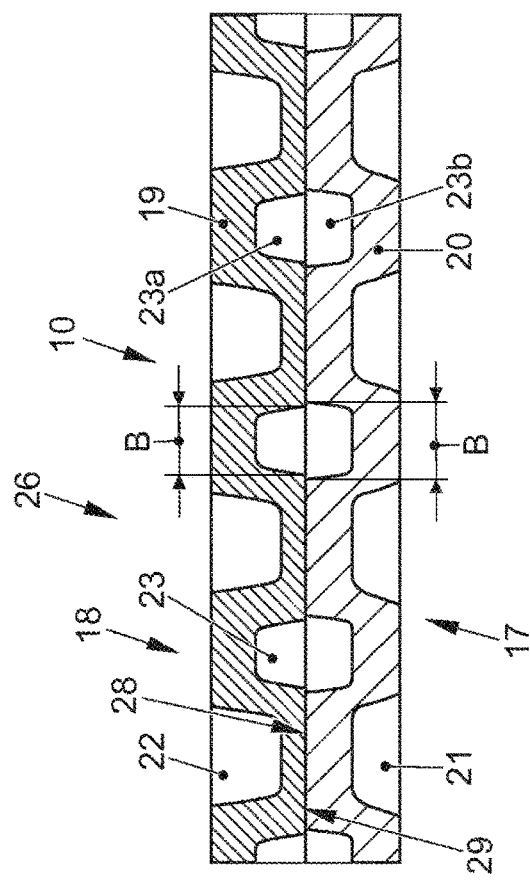
FIG. 5 is a sectional view (A-A) in the transverse direction of the bipolar plate according to FIG. 2.
Figure 6:
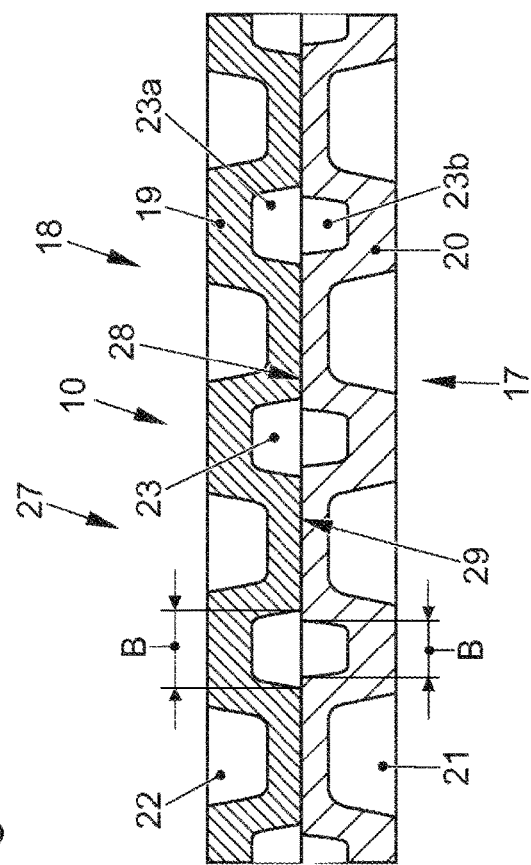
FIG. 6 is a sectional view (B-B) in the transverse direction of the bipolar plate according to FIG. 2.

FIGS. 5 and 6 represent a slightly varied embodiment of the bipolar plate according to FIGS. 2 through 4 and once again show cross-sections A-A and B-B, which show, respectively, the first side 26 (inlet side) and the second side 27 (outlet side) of the active area AA, but without any membrane electrode units being shown here. For facilitating manufacturability, the anode gas channels 22 and the cathode gas channels 21, and also the coolant channels 23, are not made to be rectangular, but instead have a trough-like design with flank angles of less than 90°. In addition, in this embodiment, the coolant subchannels 23a in the anode or cathode plate 19, 20 have widths B differing from each other. In the area of the first side 26 of the active area AA, the coolant subchannels 23a are narrower in the anode plate 19 than in the cathode plate 20. The reverse is true in the area of the second side 27, and the coolant subchannels 23a are narrower in the cathode plate 20 than in the anode plate 19. Between the first and second sides 26, 27, there is of course an area in which both coolant subchannels 23a, 23b have the same width B.

FIG. 7 also shows a bipolar plate 10 in a longitudinal section C-C, whose course is shown in FIG. 8. FIGS. 8 and 9 show cross-sections A-A and B-B of the bipolar plate 10, showing, respectively, the first side 26 (inlet side) and the second side 27 (outlet side) of the active area AA of the bipolar plate 10.

In contrast to the embodiment shown in FIGS. 2 through 6, the profiled sides of the anode and cathode plates 19, 20 are piano-parallel, but not so the mutually-facing sides 28, 29 into which the coolant subchannels 23a, 23b are incorporated.

The mutually-facing sides 28, 29 run parallel to the anode gas channels and the cathode gas channels. This means that there is no change in the partial cross-sectional area and/or the hydraulic partial diameter of the coolant subchannels 23a, 23b in the anode and the cathode plates 19, 20.

Figure 10:
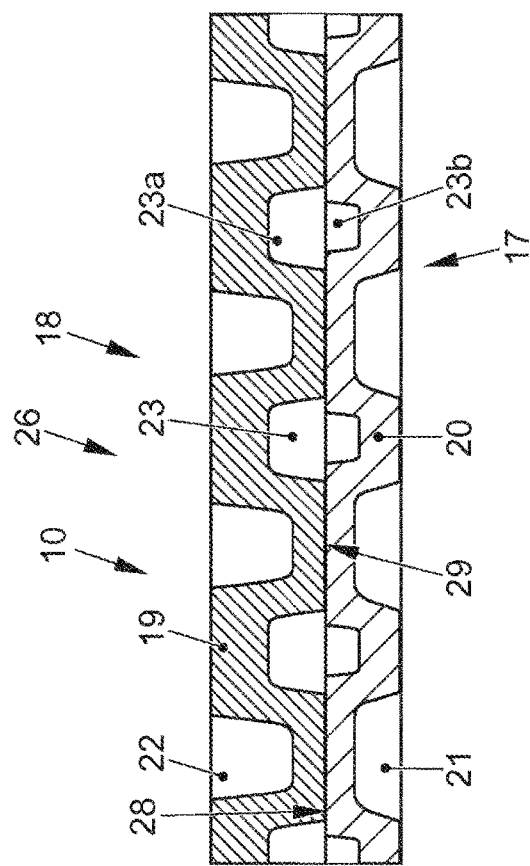
FIG. 10 is a sectional view (A-A) in the transverse direction of the bipolar plate according to FIG. 7.
Figure 11:
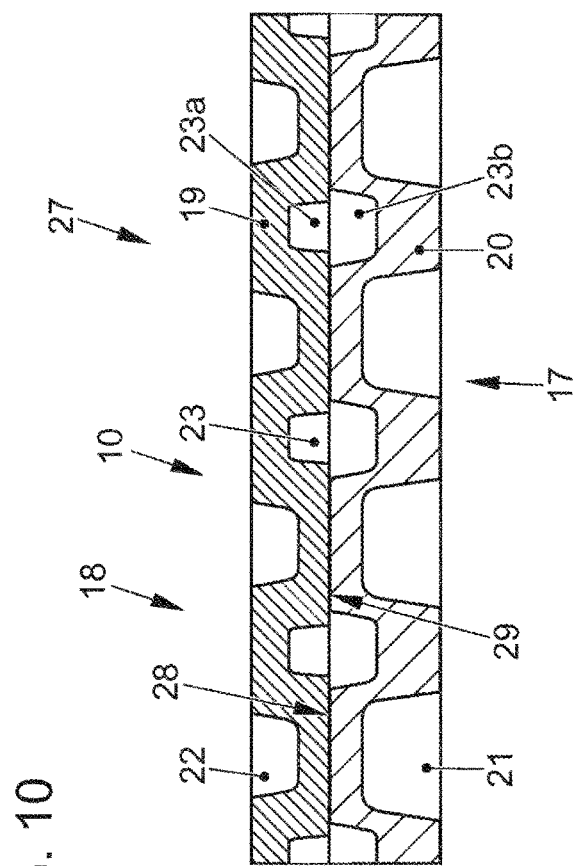
FIG. 11 is a sectional view (B-B) in the transverse direction of the bipolar plate according to FIG. 7.

FIGS. 10 and 11 show, as do FIGS. 5 and 6, a slightly varied embodiment of the bipolar plate according to FIGS. 7 through 9, with trough-like anode gas channels 22 and cathode gas channels 21 (having flank angles less than 90°), as well as coolant channels 23.

Although, in this variant, the forms of the partial coolant cross-section of the coolant subchannels 23a, 23b are different, the cross-sectional area and/or the hydraulic diameter does, however, remain constant. In addition, the thickness of the material between the coolant channels 23 and the adjacent anode gas channels 22 and cathode gas channels 21 is also constant.

FIG. 12 again shows a bipolar plate 10 according to FIG. 1 in a longitudinal section C-C, the course of which is shown in FIG. 13. FIGS. 13 and 14 show cross-sections A-A and B-B of the bipolar plate 10, showing, respectively, the first side 26 (inlet side) and the second side 27 (outlet side) of the active area AA of the bipolar plate 10.

The profiled sides of the anode and cathode plates 19, 20, as also their mutually-facing sides 28, 29 into which the coolant subchannels 23a, 23b are incorporated, are piano-parallel in form.

Differing from the other embodiments illustrated, the coolant channels 23 are not aligned parallel to the anode gas and cathode gas channels 22, 21, but rather to the mutually-facing sides 28, 29 of the anode plate 19 and the cathode plate 20.

Figure 15:
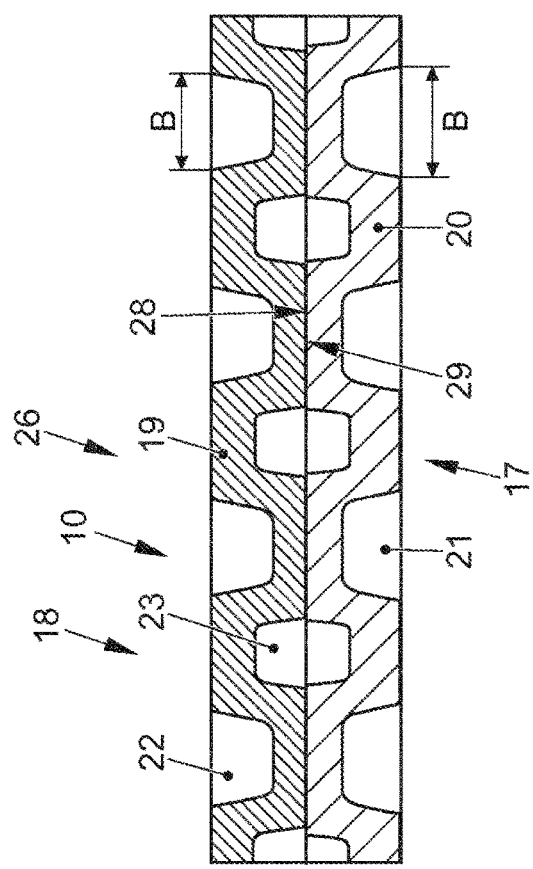
FIG. 15 is a sectional view (A-A) in the transverse direction of a bipolar plate according to a fourth.
Figure 16:
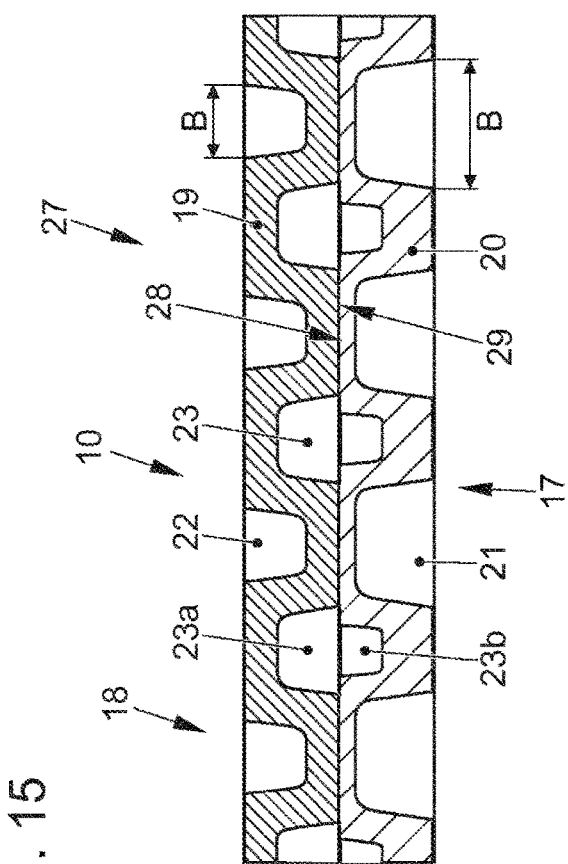
FIG. 16 is a sectional view (B-B) in the transverse direction of the bipolar plate according to a fourth FIG. 12.

FIGS. 15 and 16 represent an embodiment of the bipolar plate 10, in which the width B of anode and cathode gas channels 22, 21 is varied, and again show cross-sections A-A and B-B, which show, respectively, the first side 26 (inlet side) and the second side 27 (outlet side) of the active area AA, in which the width B of the anode gas channels 22 decreases from the first side 26 to the second side 27 of the active area AA. In contrast, the width B of the cathode gas channels 21 increases from the first side 26 to the second side 27 of the active area AA. The coolant channels 23, on the other hand, extend over the active area AA with a constant cross-sectional area and/or a constant hydraulic diameter, wherein the distance from the anode and cathode gas channels 21, 22 remains constant, and wherein the coolant subchannels 23a in the anode plate 19 have an increasing partial cross-sectional area and/or a hydraulic partial diameter. In the case of the cathode plate 20, this is formed in exactly the opposite way. The profiled sides of the anode and cathode plates 19, 20, as also their mutually-facing sides 28, 29 into which the coolant subchannels 23a, 23b are incorporated, are piano-parallel in form.

The anode gas channels 22 and the cathode gas channels 21, and also the coolant channels 23, have a trough-like design with flank angles of less than 90°.

LIST OF REFERENCE SYMBOLS

10 Bipolar plate
11 Anode inlet opening
12 Anode outlet opening
13 Cathode inlet opening
14 Cathode outlet opening
15 Coolant inlet opening
16 Coolant outlet opening
17 Cathode side
18 Anode side
19 Anode plate
20 Cathode plate
21 Cathode gas channel
22 Anode gas channel
23 Coolant channel
23a, 23b Coolant subchannels
24 Seal
25 Membrane electrode unit
26 First side
27 Second side
28, 29 Side
AA Active area (reaction area)
IA Inactive area
SA Supply area
DA Distribution area
H Height
B Width

The invention claimed is:

1. A bipolar plate for a fuel-cell, comprising:
an anode plate;
a cathode plate;
an active area;
two supply areas for supply and discharge of operating media to or from the active area, each of the two supply areas having:
an anode gas port for supplying or discharging fuel;
a cathode gas port for supplying or discharging oxidant; and
a coolant port for supplying or discharging coolant; and
wherein:
the anode plate includes anode gas channels;
the cathode plate includes cathode gas channels, each of the anode gas channels and the cathode gas channels have open channel structures and are arranged above one another, and the anode plate and the cathode plate are on adjacent sides and form coolant channels which connect coolant inlets of the two supply areas;
a height or a width of the cathode gas channels of a first side of the active area increases toward a second side of the active area;
a height or a width of the anode gas channels of the first side of the active area decreases in a direction of flow toward the second side of the active area;
a cross-sectional area of the cathode gas channels increases;
a cross-sectional area of the anode gas channels decreases; and
a partial cross-sectional area or a hydraulic partial diameter of coolant sub-channels formed in the anode plate increases from the first side of the active area to the second side of the active area, and a partial cross-sectional area or a hydraulic partial diameter of coolant sub-channels formed in the cathode plate decreases from the first side of the active area to the second side of the active area.

2. The bipolar plate according to claim 1 wherein the bipolar plate is rectangular.

3. The bipolar plate according to claim 1 wherein mutually-opposing sides of the anode plate and the cathode plate are plano-parallel to each other.

4. The bipolar plate according to claim 1 wherein at least one of mutually-facing sides of the anode plate and the cathode plate are plano-parallel to each other or mutually-opposing sides of the anode plate and the cathode plate are plano-parallel to each other.

5. The bipolar plate according to claim 1 wherein a cross-sectional area or a hydraulic diameter of the coolant channels in the active area is constant.

6. The bipolar plate according to claim 3 wherein a cross-sectional area or a hydraulic diameter of the coolant channels is constant along the active area.

7. The bipolar plate according to claim 1 wherein the coolant channels extend parallel to surfaces of the anode gas channels and parallel to surfaces of the cathode gas channels.

8. The bipolar plate according to claim 1 wherein a surface of the anode plate engaged with the cathode plate and a surface of the cathode plate engaged with the anode plate each extend in a direction parallel to surfaces of the anode gas channels and parallel to surfaces of the cathode gas channels.

9. The bipolar plate according to claim 1 wherein the coolant channels extend parallel to a surface of the anode plate engaged with the cathode plate and parallel to a surface of the cathode plate engaged with the anode plate.

10. A fuel-cell stack, comprising:
at least one bipolar plate, the bipolar plate including:
an anode plate;
a cathode plate;

an active area;
two supply areas for supply and discharge of operating media to or from the active area, each of the two supply areas having:
an anode gas port for supplying or discharging fuel;
a cathode gas port for supplying or discharging oxidant; and
a coolant port for supplying or discharging coolant; and wherein:
the anode plate includes anode gas channels;
the cathode plate includes cathode gas channels, each of the anode gas channels and the cathode gas channels have open channel structures and are arranged above one another, and the anode plate and the cathode plate are on adjacent sides and form coolant channels which connect coolant inlets of the two supply areas;
a height or a width of the cathode gas channels of a first side of the active area increases toward a second side of the active area;
a height or a width of the anode gas channels of the first side of the active area decreases toward the second side of the active area;
a cross-sectional area of the cathode gas channels increases;
a cross-sectional area of the anode gas channels decreases; and
a partial cross-sectional area of coolant sub-channels formed in the anode plate increases from the first side of the active area to the second side of the active area, and a partial cross-sectional area of coolant sub-channels formed in the cathode plate decreases from the first side of the active area to the second side of the active area.

11. The fuel-cell stack according to claim 10 wherein a cross-sectional area of the coolant channels in the active area is constant.

12. The fuel cell according to claim 10 wherein a hydraulic diameter of the cathode gas channels increases and a hydraulic diameter of the anode gas channels decreases.

13. A vehicle, comprising:
a fuel-cell system, including a fuel-cell stack, the fuel-cell stack having:
at least one bipolar plate including:
an active area having a first side and a second side;
an anode plate having anode gas channels; and
a cathode plate having cathode gas channels, the cathode plate positioned adjacent to the anode plate to locate each of the anode gas channels adjacent to a corresponding cathode gas channel, each of the anode gas channels and the cathode gas channels positioned within the active area of the at least one bipolar plate;
wherein a depth and a cross-sectional area of the anode gas channels each taper between the first side of the active area and the second side of the active area in a first direction;
wherein a depth and a cross-sectional area of the cathode gas channels each taper between the first side of the active area and the second side of the active area in a second direction that is opposite to the first direction;
wherein coolant channels are formed by a first portion of the coolant channels disposed in the anode plate and a second portion of the coolant channels disposed in the cathode plate; and
wherein a partial cross-sectional area or a hydraulic partial diameter of coolant sub-channels formed in the anode plate increases from the first side of the active area to the second side of the active area, and a partial cross-sectional area or a hydraulic partial diameter of coolant sub-channels formed in the cathode plate decreases from the first side of the active area to the second side of the active area.

14. The vehicle according to claim 13 wherein a cross-sectional area of the coolant channels in the active area is constant.

15. The vehicle according to claim 13 wherein at least one of mutually-facing sides of the anode plate and the cathode plate are plano-parallel to each other or mutually-opposing sides of the anode plate and the cathode plate are plano-parallel to each other.

* * * * *